J. Y. BRICKEY.
Mold for Running Plaster Cornice.
No. 201,493. Patented March 19, 1878.
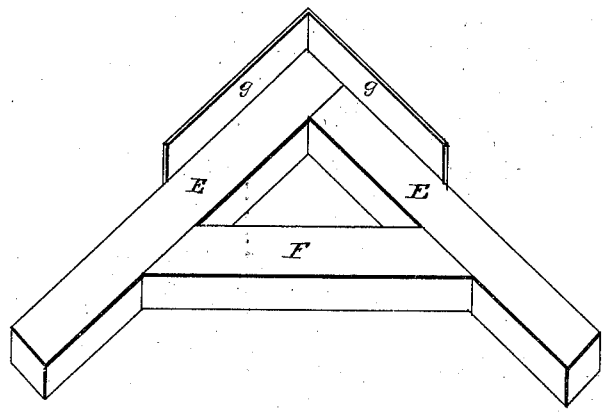
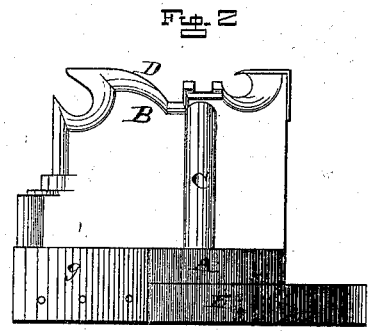
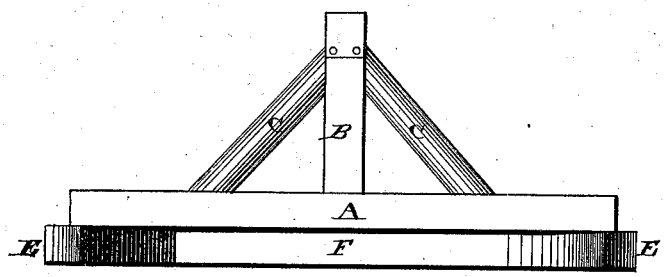
WITNESSES
J. W. Garner
R. M. Barr.
INVENTOR
J. Y. Brickey,
per
F. A. Lehmann,
atty

UNITED STATES PATENT OFFICE.

JAMES Y. BRICKEY, OF LEXINGTON, KENTUCKY.

IMPROVEMENT IN MOLDS FOR RUNNING PLASTER CORNICES.

Specification forming part of Letters Patent No. 201,493, dated March 19, 1878; application filed December 3, 1877.

*To all whom it may concern:*

Be it known that I, JAMES Y. BRICKEY, of the city of Lexington, county of Fayette, and State of Kentucky, have invented certain Improvements in Molds for Running Moldings in all kinds of Plaster, of which the following is a specification:

My invention relates to the combination of the mold and the guide-strip secured to the wall, on which the mold rests and is guided, having a brace at the angle that not only serves to square the corner, but serves as a rest and guide to the mold in passing from one wall to the other.

Figure 1 is a perspective of the guide or support alone. Fig. 2 is a side elevation of the mold and the guide or support, and Fig. 3 is an edge view of the same.

A is a triangular square, to which the mold is attached, and serves as a base for same. B is the supporter of metal mold. C C are braces to same, resting on the base A, and holding the mold-support B firmly in its upright position. D is the metal mold supported by B. E E are the guide-strips secured to the walls, and on which the base A of the mold rests when in operation. F is the brace in the angle from the guide-strip on one wall to that of the other, and also serves as a support to the base A in passing from one wall to the other. G G are guides-pieces for the purpose of rectifying any defects in the angle of the room.

The operation of using this double-faced mold does not differ materially from the use of the molds now in use, excepting that (instead of being compelled to stop short of the angle, as now, and transfer the mold to the other wall, and proceed to next angle, or near it, and then transfer same to the next wall, as last named, until all of the lines of moldings are run, leaving all of the angles unfinished, and which are now finished with trowel by hand) by the use of this double-faced mold the molding can be finished as completely in the angles as along the walls between the same, as the mold can be pushed into the corner, and, being double faced, by means of the metal mold being set at forty-five degrees angle to the walls on which the moldings are being run, said mold can, without changing base, be run along the next wall, finishing the angles in greater perfection than is now done by hand.

Returns can be made on the smallest projections, and on which it is impossible to use the common mold.

With this double-faced mold the cornice of a room can be completed in one-half the time that is required with the present form of mold, and consequently will make so great a reduction in the price of such work as to induce a much greater amount of ornamental work being introduced into building than is now done.

A molding is easier run with this form of mold than with the present mold, as the plaster cannot gather, and, even if it should do so, the mold, passing over it once, cuts it down to the desired form.

My form of mold is as easily made as those of the present form, and all plasterers can and will readily understand its construction and operation, and cannot fail to appreciate its great utility and value to the trade and public generally.

I claim as my invention—

The combination of the support E, provided with the brace F and the flanges $g$ at the corner, with the mold A D B C, the two parts being constructed and arranged for operation substantially as shown and described.

JAMES Y. BRICKEY.

Witnesses:
JOHN MCMURTRY,
HENRY STEELE.